United States Patent
Jaenker et al.

[11] Patent Number: 6,134,964
[45] Date of Patent: Oct. 24, 2000

[54] MECHANICAL RESONATOR HAVING A VARIABLE RESONANCE FREQUENCY

[75] Inventors: Peter Jaenker, Garching; Henning Strehlow, Munich, both of Germany

[73] Assignee: DaimlerChrysler AG, Stuttgart, Germany

[21] Appl. No.: 09/150,358

[22] Filed: Sep. 9, 1998

[30] Foreign Application Priority Data

Sep. 11, 1997 [DE] Germany ............................ 197 39 877

[51] Int. Cl.$^7$ ............................ G01P 15/13; H03B 5/30
[52] U.S. Cl. ................................ 73/514.21; 73/514.36; 331/156; 333/200
[58] Field of Search ............................ 73/514.17, 514.18, 73/514.21, 514.24, 514.36, 862.39, 862.41, 862.42, 862.471, 862.59, 862.61; 310/330, 332; 331/154, 155, 156; 333/186, 187, 191, 197, 200

[56] References Cited

U.S. PATENT DOCUMENTS

| | | | |
|---|---|---|---|
| 3,609,593 | 9/1971 | Boll | 331/156 |
| 3,614,677 | 10/1971 | Wilfinger | 333/71 |
| 3,634,787 | 1/1972 | Newell | 333/72 |
| 4,186,324 | 1/1980 | Hartzell, Jr. | 310/329 |
| 4,803,883 | 2/1989 | Shutt | 73/514.21 |

*Primary Examiner*—Helen C. Kwok
*Attorney, Agent, or Firm*—W. F. Fasse; W. G. Fasse

[57] ABSTRACT

A mechanical resonator has an electronically adjustable resonance frequency and is especially adapted to be used as a tunable vibration absorber. The mechanical resonator includes an inertial mass mounted on a free end of a spring, which is secured at its other end to the structure that is to be vibrationally damped. In order to vary the resonant frequency of the resonator, an electromechanical converter such as a piezoelectric element is connected to the spring and/or the inertial mass, and a displacement and/or acceleration sensor provides a sensor signal that is dependent on the respective displacement and/or acceleration of the spring and/or the inertial mass. An electronic control circuit generates an actuating signal based on the sensor signal. The actuating signal is applied to the electro-mechanical converter, which responsively exerts an adjusting force onto the spring and/or the inertial mass. The control circuit may include one or more variable amplifiers, inverters, and phase shifters, to control the actuating signal such that the adjusting force exerted by the electromechanical converter either counteracts or reinforces the bending force exerted by the inertial mass on the spring. In this manner, the effective total spring constant of the resonator can be increased or decreased relative to the inherent spring constant of the spring, whereby the resonant frequency is adjusted.

23 Claims, 2 Drawing Sheets

MECHANICAL RESONATOR HAVING A VARIABLE RESONANCE FREQUENCY

PRIORITY CLAIM

This application is based on and claims the priority under 35 U.S.C. §119 of German Patent Application 197 39 877.4, filed on Sep. 11, 1997. The entire disclosure of German Patent Application 197 39 877.4 is incorporated herein by reference.

FIELD OF THE INVENTION

The invention relates to a mechanical resonator having a variable resonance frequency, which is especially adapted for use in a vibration absorber or active damper, and which includes an inertial mass and a spring that is secured at at least one end.

BACKGROUND INFORMATION

The resonance frequency of a mechanical resonator, such as a spring-mass vibrator, is essentially determined by the spring stiffness or spring constant of the spring and the size, i.e. mass, of the vibrating inertial mass. It is possible to vary the resonance frequency by correspondingly varying either one or both of these parameters, in order to tune the resonator, for example to match the vibrations of a vibrating body that are to be damped. Such a tuning adjustment is technically simple to carry out, for example by displacing the center of mass of the inertial mass or by moving the fixing location of the spring, but necessarily involves a considerable structural effort and complexity. Namely, the actual structure or arrangement of the mechanical components of the resonator must be physically altered to achieve such an adjustment of the resonance frequency. Most significantly, the adjustment of the resonance frequency, and therewith the tuning of the resonator, can only be achieved rather slowly.

SUMMARY OF THE INVENTION

In view of the above, it is an object of the present invention to provide a mechanical resonator having a variable resonance frequency, which may be adjusted much more quickly, i.e. with a shorter reaction time, and in a considerably simpler manner than could be achieved according to the prior art. The invention further aims to avoid or overcome the disadvantages of the prior art, and to achieve additional advantages, as apparent from the present description.

The above objects have been achieved by a mechanical resonator according to the invention, comprising a spring that is fixed at at least one end, an inertial mass mounted on or movably carried by the spring, an electromechanical converter connected to at least one of the spring and the inertial mass, a displacement sensor or transducer and/or an acceleration sensor or transducer for respectively detecting the displacement and/or the acceleration of the spring and/or the inertial mass, and an electronic control unit. The electromechanical converter is adapted to apply a force to be effective on the spring and/or the inertial mass, whereby this applied force is continuously controllable by means of the electronic control unit cooperating with the sensor.

The electromechanical converter can be any known device adapted to convert an electrical signal to a mechanical force, and preferably comprises a piezoelectric element or an electrostrictive element. The sensor may be any known device adapted to convert a physical displacement, strain or acceleration into an electrical signal, and preferably comprises a piezoelectric element or an electrostrictive element. Some or all of the components may alternatively be embodied to function optically rather than electrically, i.e. the above mentioned electrical signals may instead be optical signals.

According to the invention, it is possible to virtually alter or adjust the stiffness of the spring in the mechanical resonator using an electronic feedback and control loop. In order to achieve this, at least one mechanically active element is connected to or incorporated in the spring, for example, wherein this active element may be electrically actuated in order to introduce adjusting forces or moments into the spring. Thus, an electric actuating or control signal can directly and immediately influence the external mechanical action and effect of the spring.

More specifically, tuning of the mechanical resonance frequency can be achieved by means of a displacement-dependent actuation of the mechanically active element. To achieve this, the inventive arrangement includes a displacement or acceleration sensor, which senses the deflection or acceleration of the spring and/or the inertial mass and accordingly converts this sensed physical quantity into a displacement-dependent electrical signal. This signal in turn is provided to an electronic control unit, which processes the signal as required, for example for a phase correction or the like, and then outputs a signal that accordingly actuates the electromechanical converter in such a manner so as to apply an adjusting force to the spring. The actuating force may be directed either to oppose the displacement of the spring or to reinforce the deflecting inertial force, as necessary. In the former case, the resultant effect is an apparent increase in the spring stiffness, because there is an additional force resisting or opposing the deflection of the spring. In the latter case, the resultant effect is an apparent reduction in the spring stiffness, because the active inertial force is effectively increased or reinforced by the applied adjusting force. Also in the latter case, the applied adjusting force may not exceed the elasto-mechanical return force of the spring, to avoid exceeding the limits of the spring.

BRIEF DESCRIPTION OF THE DRAWINGS

In order that the invention may be clearly understood, it will now be described, in connection with example embodiments, with reference to the drawings, wherein.

DETAILED DESCRIPTION OF PREFERRED EXAMPLE EMBODIMENTS AND OF THE BEST MODE OF THE INVENTION

Figure 1:
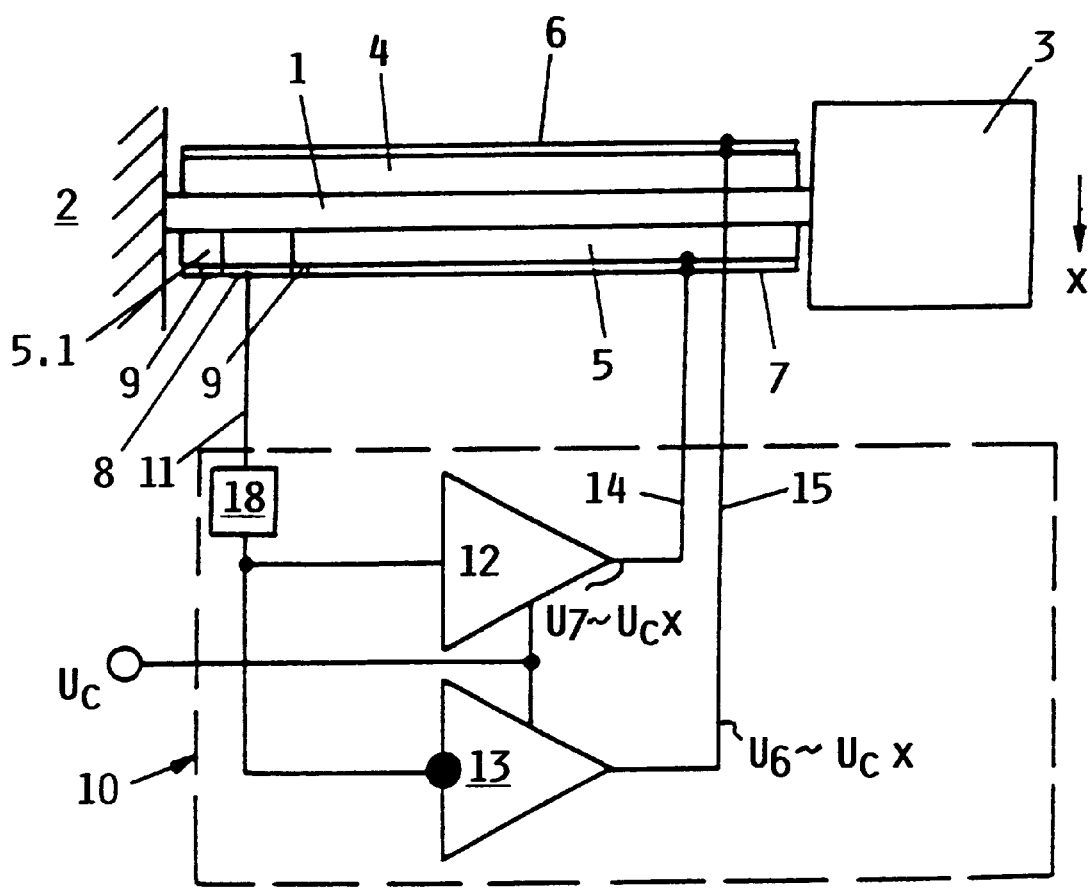
FIG. 1 is a general schematic diagram of a mechanical resonator including a piezoelectric converter and a displacement sensor.

In the example embodiment shown in FIG. 1, the inventive arrangement includes a leaf spring 1 made of spring steel, for example, which is rigidly connected at a first location and particularly at its left end to a structure 2 that is to be vibrationally damped. A massive body 3 providing an inertial mass is mounted on the right, freely vibrating end of the leaf spring 1. As shown, the spring 1 is unsupported between its left end and its right freely vibrating end. The schematic representation of the massive body 3 in FIG. 1 applies both to an actual physical arrangement of a massive body 3 on the free end of the spring 1, and to an arrangement in which the mass of the spring 1 itself is sufficient so that an additional physical massive body 3 can be omitted. In other words, the inertial mass may be incorporated in the spring 1 itself.

Two respective piezoelectric layers or elements 4 and 5 are connected in a force transmitting and electrically conducting manner respectively to the opposite surfaces of the leaf spring 1 between its left end and its right end. Particularly, the piezoelectric elements extend along the leaf spring along an entire length of the piezoelectric elements. The two piezoelectric layers 4 and 5 are respectively polarized in the thickness direction so that their characteristic piezoelectric strain will cause a bending deflection of the spring 1 upward and downward in the view of FIG. 1 as will be explained below. To electrically actuate the piezoelectric layers 4 and 5, a respective elastic contact 6 and 7 is provided on the outer surface, i.e. the surface facing away from the leaf spring 1, of each piezoelectric layer 4 and 5.

One of the elastic contacts 7 is separated or cut by separating gaps 9 to form a contact portion 8 that is electrically isolated from the remainder of the respective elastic contact 7. This contact portion 8 is connected to its own separate electrical conductor 11. The remaining portions of the contacts 6 and 7 are connected with electrical conductors 15 and 14 as will be described below. Underlying the contact portion 8, a separated region 5.1 of the piezoelectric layer 5 is formed, which is used as an active displacement sensor. Namely, a displacement x of the massive body 3 will bend the spring 1, and correspondingly bend the piezoelectric layer 5, whereby, due to the piezoelectric effect, the separated region 5.1 of the piezoelectric layer 5 will output a displacement-dependent voltage signal $U_S$ that is proportional to or dependent on the displacement x.

The voltage signal $U_S$ provided by the separate region 5.1 of the piezoelectric layer 5 acting as the displacement sensor is conducted via an electrical conductor 11 to an electronic control unit 10, where it is provided as an input to two respective amplifiers 12 and 13, whereby one of the amplifiers is an inverting amplifier. A control voltage $U_C$ is applied to the two amplifiers 12 and 13 as an amplification factor, such that the input signal $U_S$ is accordingly amplified by the factor $U_C$ to provide two output voltages $U_6$ and $U_7$ having respective opposite signs, which are conducted from the two amplifiers 13 and 12 via electrical conductors 15 and 14 to the contacts 6 and 7 respectively. Thereby, the two piezoelectric layers 4 and 5 are energized with the respective opposite voltages $U_6$ and $U_7$, which are dependent on the displacement direction of the massive body 3.

In response to the applied actuating voltages, one of the piezoelectric layers will be elongated while the other one of the layers will be contracted. The respective strain of the two piezoelectric layers 4 and 5 exerts a bending force $F_p$ onto the leaf spring 1. The direction and magnitude of the bending force $F_p$ are selected and controlled as desired by appropriate controlled application of the actuating voltages. For example, the bending force $F_p$ may be oriented contrary to the respective deflection of the spring 1 at any point in time. Furthermore, the magnitude of the bending force $F_p$ is dependent on both the amplification factor voltage $U_C$ as well as the displacement x.

The control circuit or unit 10 may optionally include additional signal processing elements for further tuning or adjusting the actuating signal applied to the piezoelectric layers. For example, a variable or adjustable phase shifter 18 may be arranged to shift the phase of the displacement dependent signal $U_S$, if necessary, and to such an extent as necessary, so that the resulting actuating signals $U_6$ and $U_7$ are applied to the piezoelectric layers 4 and 5 with an appropriate phase relative to the bending phase of the spring 1. Thereby the resultant force $F_p$ can be controlled to reinforce or counteract, as desired, the bending of the spring 1 as accurately as possible. The above described system can be characterized by the following equation of motion:

$$m\ddot{x}+k\dot{x}+Dx+F_p=0,$$

wherein:
 m=mass of the massive body 3;
 x=displacement of the massive body 3;
 D=spring constant of the spring 1;
 k=damping factor.

In the above equation, the displacement-proportional forces $F_p$ and Dx can be combined into a single term $D_v(U_C)x$, wherein $D_v$ represents the combined virtual stiffness or spring constant of the spring 1 in combination with the active piezoelectric layers 4 and 5. Moreover, it is apparent that this single combined force term can be varied as desired by correspondingly varying the control input or amplification factor voltage $U_C$.

This control input $U_C$ can also be selected properly such that the resulting bending force $F_p$ becomes negative, which would have the opposite effect as compared to the above described situation, i.e. the force $F_p$ will be effective in the same direction as the deflection or displacement x. In this case, the effective stiffness of the spring 1 in combination with the piezoelectric layers 4 and 5 is reduced, i.e. the term $D_v(U_C)$ becomes smaller than D, and accordingly the resonance frequency of the spring 1 combined with the piezoelectric layers 4 and 5 is reduced. In this context, the control input or amplification factor $U_C$ is limited to such values for which $D_v(U_C)$ is still positive.

Figure 2:
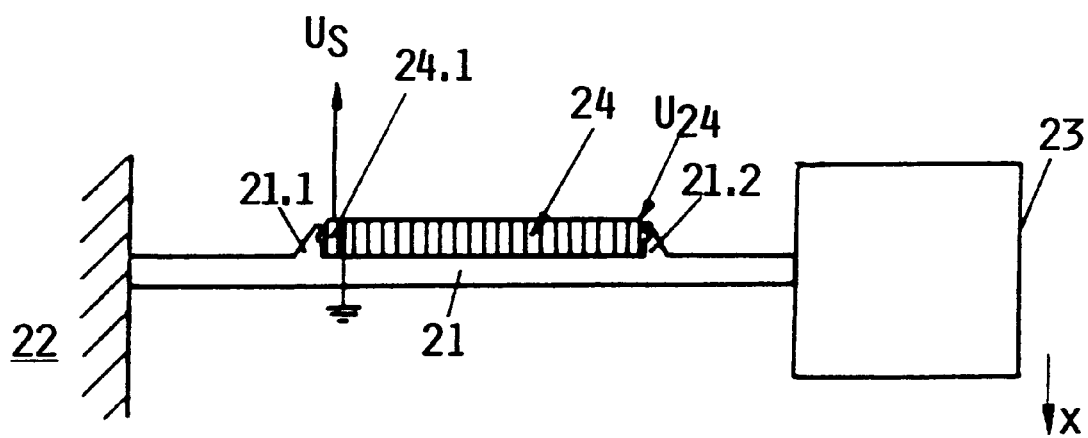
FIG. 2 is a general schematic diagram of a mechanical resonator including a stack of piezoelectric elements as an electromechanical converter.

FIG. 2 shows another example embodiment of an arrangement according to the invention. In this embodiment, a bending beam 21 made of spring steel, for example, is secured in a force transmitting manner at one end thereof to a structure 22 that is to be vibrationally damped or compensated. A massive body 23 is provided on the free end of the bending beam 21. The bending beam 21 includes a bending beam body with two bearing blocks 21.1 and 21.2 protruding therefrom, with a stack of piezoelectric elements 24 clampingly held between the two bearing blocks 21.1 and 21.2 in an orientation with a stacking axis of the stack extending along the bending beam 21. Any deflection or displacement x of the massive body 23 will cause bending of the beam 21, and consequently will exert compressive or tensile forces onto the stack of piezoelectric elements 24.

Thus, one segment 24.1, such as an individual piezoelectric element, can be used as a sensor for producing and providing a voltage signal $U_S$ dependent on the displacement x, while the rest of the stack of piezoelectric elements 24 is used as an electromechanical converter to apply a controlled adjusting force to the bending beam, in a manner analogous to that described above with reference to FIG. 1. Namely, this remaining portion of the piezoelectric stack acting as an electromechanical converter is electrically actuated by applying thereto an actuation voltage $U_{24}$ that is generated by amplifying the displacement dependent signal $U_S$ by an amplification factor as described above. The control circuit and conductors are not shown in FIG. 2, but can be embodied and connected in a manner similar to that shown in FIG. 1, whereby only a single amplifier would be necessary for providing the single actuation voltage for the single piezoelectric device.

Figure 3:
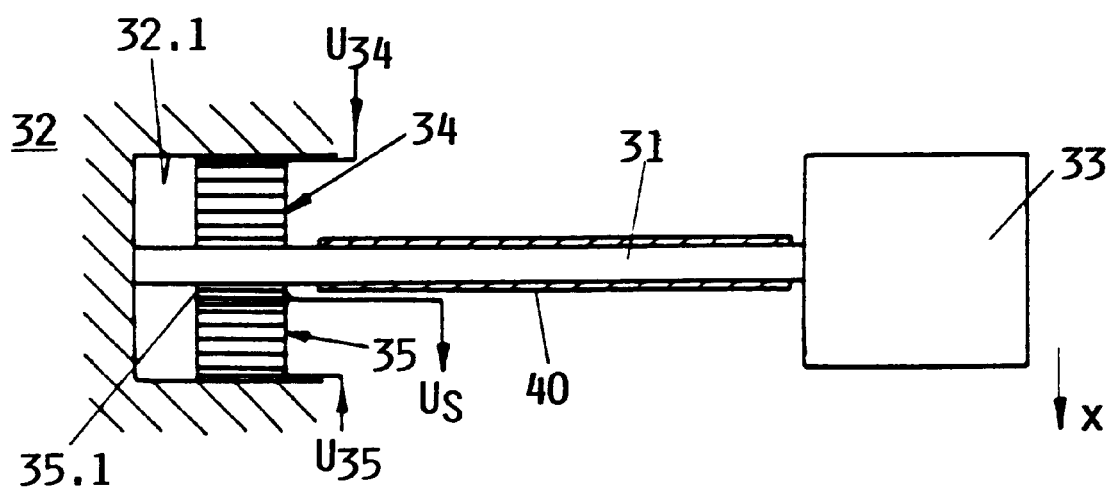
FIG. 3 is a general schematic diagram of a mechanical resonator including a bending beam clampingly held near one end between two stacks of piezoelectric elements.

FIG. 3 shows yet another example embodiment, wherein a bending beam 31 is secured at one end to a structure 32 that is to be vibrationally damped or compensated, and near this secured end, the bending beam 31 is additionally clampingly held between two stacks 34 and 35 of piezoelectric elements, which in turn are arranged and supported in a recess 32.1 of the structure 32. One segment 35.1, for example one of the piezoelectric elements, of the piezoelectric stack 35 is electrically isolated from the rest of the stack, for example analogously as in FIGS. 1 or 2, and may thus be used as a displacement sensor for generating an output signal voltage $U_S$ that is dependent on the displacement x of the massive body 33 provided on the free end of the bending beam 31. This displacement-dependent voltage signal $U_S$ is amplified in a manner as described above with reference to FIG. 1, to provide two actuating voltages $U_{34}$ and $U_{35}$, which are applied respectively to the two piezoelectric stacks 34 and 35. Thereby, the two stacks 34 and 35 may be oppositely actuated, so that one stack becomes elongated while the other stack becomes contracted, so as to apply a bending force to the bending beam 31, to either counteract or reinforce the bending deflection exerted on the bending beam 31 by the vibrating massive body 33, in the manner as described above.

In order to increase the damping of the resonator arrangement according to FIG. 3, a damping mass 40 may be coated or otherwise applied onto the spring member, i.e. the bending beam 31 in this case. Such a damping mass 40 can also be applied to the spring member 1 in the embodiment of FIG. 1, and to the bending beam 21 in the embodiment of FIG. 2.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A mechanical resonator with a variable resonance frequency, comprising:
   a spring member rigidly supported at a first location;
   an inertial mass coupled to said spring member;
   an electromechanical converter coupled to at least one of said spring member and said inertial mass, at a second location that is located on said spring member between said first location and said inertial mass or on said inertial mass;
   at least one sensor selected from the group consisting of displacement sensors and acceleration sensors coupled to at least one of said spring member and said inertial mass and adapted to sense, and provide a sensor output signal dependent on, at least one of a displacement and an acceleration of said at least one of said spring member and said inertial mass;
   an electronic control unit; and
   respective electrical conductors connecting said at least one sensor to said electronic control unit and connecting said electronic control unit to said electromechanical converter;
   wherein said electronic control unit is adapted to provide to said electromechanical converter an actuation signal that is dependent on said sensor output signal; and
   wherein said electromechanical converter is adapted to exert a force, responsively to said actuation signal, at said second location onto said at least one of said spring member and said inertial mass to which said electromechanical converter is coupled, so as to vary a resonant frequency of a combination of said inertial mass coupled to said spring member.

2. The mechanical resonator according to claim 1, wherein said electromechanical converter is coupled to said spring member at said second location between said first location and said inertial mass, and said sensor is a displacement sensor and is coupled to said spring member.

3. The mechanical resonator according to claim 1, wherein said inertial mass comprises a massive body secured to a free end of said spring member.

4. The mechanical resonator according to claim 1, wherein said inertial mass and said spring member are integrated together into a massive flexible member.

5. The mechanical resonator according to claim 1, wherein said sensor, said conductors, said electronic control unit and said electromechanical converter form an electronic feedback loop adapted to provide a controlled mechanical feedback through said electromechanical converter into said at least one of said spring member and said inertial mass.

6. The mechanical resonator according to claim 1, wherein said spring member comprises a leaf spring, and said electromechanical converter comprises at least one respective piezoelectric layer connected in a force transmitting manner to at least one respective surface of said leaf spring.

7. The mechanical resonator according to claim 6, wherein said sensor comprises a piezoelectric layer portion that is adjacent but electrically isolated from said piezoelectric layer of said electromechanical converter.

8. The mechanical resonator according to claim 6, wherein said sensor is a displacement sensor adapted to sense said displacement of said spring member, and said electronic control unit is so adapted that said actuation signal comprises an actuation voltage which increases as said displacement increases and which actuates said electromechanical converter in such a manner that said force opposes or reinforces an inertial force of said inertial mass acting on said spring member.

9. The mechanical resonator according to claim 1, wherein said spring member comprises an elastic bending beam, including a beam body and two bearing blocks that protrude from said beam body and that are spaced apart from one another in a lengthwise direction of said beam body, and said electromechanical converter comprises a stack of piezoelectric elements clampingly received between said bearing blocks at said second location so that a stacking axis of said stack of said piezoelectric elements extends along said beam body.

10. The mechanical resonator according to claim 9, wherein said sensor comprises at least one further piezoelectric element that is further included in said stack but is electrically isolated from said piezoelectric elements of said electromechanical converter.

11. The mechanical resonator according to claim 9, wherein said sensor is a displacement sensor adapted to sense said displacement of said spring member, and said electronic control unit is so adapted that said actuation signal comprises an actuation voltage which increases as said displacement increases and which actuates said electromechanical converter in such a manner that said force opposes or reinforces an inertial force of said inertial mass acting on said spring member.

12. The mechanical resonator according to claim 1, wherein said spring member comprises an elastic bending beam having a fixed end at said first location and a free end at which said inertial mass is coupled to said spring member, and said electromechanical converter comprises first and second stacks of piezoelectric elements clampingly holding said bending beam therebetween at said second location which is located nearer to said fixed end than to said free end.

13. The mechanical resonator according to claim 12, wherein said sensor comprises at least one further piezoelectric element that is further included in at least one of said stacks but is electrically isolated from said piezoelectric elements of said electromechanical converter.

14. The mechanical resonator according to claim 12, wherein said sensor is a displacement sensor adapted to sense said displacement of said spring member, and said electronic control unit is so adapted that said actuation signal comprises an actuation voltage which increases as said displacement increases and which actuates said electromechanical converter in such a manner that said force opposes or reinforces an inertial force of said inertial mass acting on said spring member.

15. The mechanical resonator according to claim 1, wherein said electromechanical converter comprises a piezoelectric element that extends along to said spring member along an entire length of said piezoelectric element, and an elastically flexible electrical contact connected to said piezoelectric element.

16. The mechanical resonator according to claim 1, further comprising a damping mass coated onto said spring member to form a coating of said damping mass on said spring member.

17. The mechanical resonator according to claim 1, further in combination with a vibratory structure to which a fixed end of said spring member is secured at said first location, wherein said mechanical resonator is an active vibration absorber adapted to actively damp vibrations of said vibratory structure.

18. The mechanical resonator according to claim 1, wherein said electronic control unit comprises at least one amplifier respectively having a signal input connected to said sensor for receiving said sensor output signal, an amplification factor input adapted to have a control voltage applied thereto, and an output connected to said electromechanical converter for providing said actuation signal thereto.

19. The mechanical resonator according to claim 18, wherein said electromechanical converter comprises two piezoelectric elements, and said electronic control unit comprises two of said amplifier, of which said output are respectively connected to said two piezoelectric elements.

20. The mechanical resonator according to claim 19, wherein said signal input of one of said two amplifiers is an inverting input.

21. The mechanical resonator according to claim 18, wherein said electronic control unit further comprises a phase shifter connected in series with said amplifier.

22. The mechanical resonator according to claim 1, wherein said spring member has a rigidly mounted fixed end and a freely deflectable free end, said first location is located at said fixed end, said inertial mass is coupled to said spring member at said free end, and said spring member is unsupported between said fixed end and said free end.

23. The mechanical resonator according to claim 7, wherein said piezoelectric layer portion of said sensor and said piezoelectric layer of said electromechanical converter are respective coplanar adjacent electrically independent portions of a single layer of piezoelectric material.

* * * * *